United States Patent [19]

Warburton et al.

[11] Patent Number: 5,288,193

[45] Date of Patent: Feb. 22, 1994

[54] QUARTER TURN BALE LIFT ARM FOR ROUND BALE MOVERS

[76] Inventors: John R. Warburton, Box 39, Poplar Point, Manitoba, Canada, R0H 0Z0; Russell E. Reyher, 2302 Burrows Avenue, Winnipeg, Manitoba, Canada, R2R 1G7; Randy E. Reyher, 896 Isbister St., Winnipeg, Manitoba R2Y 1R7, Canada

[21] Appl. No.: 824,538

[22] Filed: Jan. 23, 1992

[30] Foreign Application Priority Data

Dec. 3, 1991 [CA] Canada ................................ 2056897

[51] Int. Cl.⁵ ........................ A01D 87/12; B60P 1/48
[52] U.S. Cl. .................................. 414/24.5; 414/501; 414/111; 414/553
[58] Field of Search ............... 414/546, 550, 551, 552, 414/553, 24.5, 24.6, 111, 470, 477, 483, 501, 911

[56] References Cited

U.S. PATENT DOCUMENTS

| | | | |
|---|---|---|---|
| 3,942,666 | 3/1976 | Pframmer | 414/24.5 X |
| 3,967,742 | 7/1976 | Meinert | 414/24.5 |
| 4,117,940 | 10/1978 | Adam | 414/24.5 |
| 4,261,676 | 4/1981 | Balling, Sr. | 414/552 X |
| 4,264,252 | 4/1981 | Jennings et al. | 414/24.5 |
| 4,549,840 | 10/1985 | Ansbjer | 414/24.5 |
| 4,630,986 | 12/1986 | Taylor | 414/552 X |
| 4,718,806 | 1/1988 | Chambers | 414/552 X |
| 4,909,694 | 3/1990 | Peters et al. | 414/24.5 |
| 4,938,646 | 7/1990 | Elias et al. | 414/24.5 |

FOREIGN PATENT DOCUMENTS

| | | |
|---|---|---|
| 1123389 | 5/1982 | Canada . |
| 11266698 | 6/1982 | Canada . |
| 1144524 | 4/1983 | Canada . |

Primary Examiner—Michael S. Huppert
Assistant Examiner—James T. Eller, Jr.

[57] ABSTRACT

A round bale carrier which picks up hay bales while moving in a direction perpendicular to a longitudinal end-to-end direction of a bale to be loaded onto the carrier, and a bale pick-up supported by the bale carrier. The bale pick-up comprises an open sided bale cradle including a cradle base located parallel along one side of the carrier when in a pick-up position and swingable in a horizontal plane through 90 degrees to a bale loading position relative to the carrier. First and second bale support arms are secured to the cradle base with the first bale support arm extending out at generally right angles to the cradle base an the second bale support arm being moveable at the cradle base between a bale receiving position generally perpendicular to the first bale support arm and a bale pick-up position generally parallel to the first bale support arm. The bale cradle also is liftable from the bale loading position to a bale delivery position projecting upwardly from the one side of the carrier. A control system is provided for the bale pick-up and this control system includes a first operating member which moves the second bale support arm, a second operating member which swings the cradle base and a third operating member which raises and lowers the cradle. The control system operates such tat after the first operating member moves the second bale support arm to the bales pick-up position, the third operating member raises the cradle sufficiently to elevate a bale int he cradle away form ground level before the second operating member swings the cradle to the bale loading position. The third operating member then continues to raise the cradle to the bale delivery position.

7 Claims, 7 Drawing Sheets

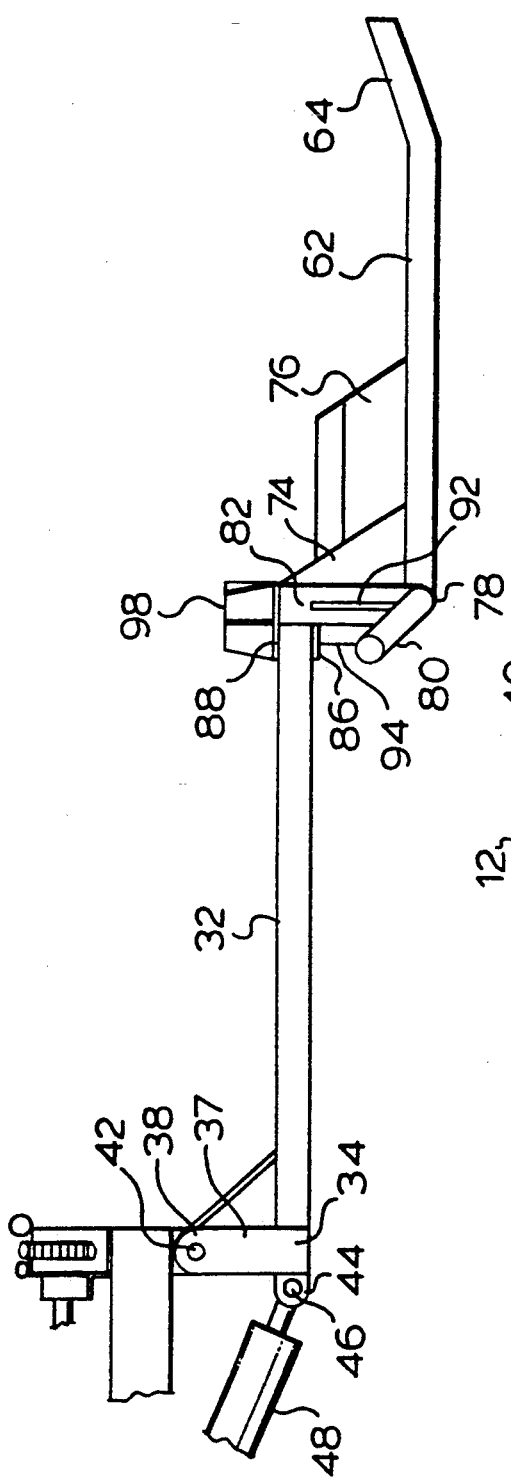
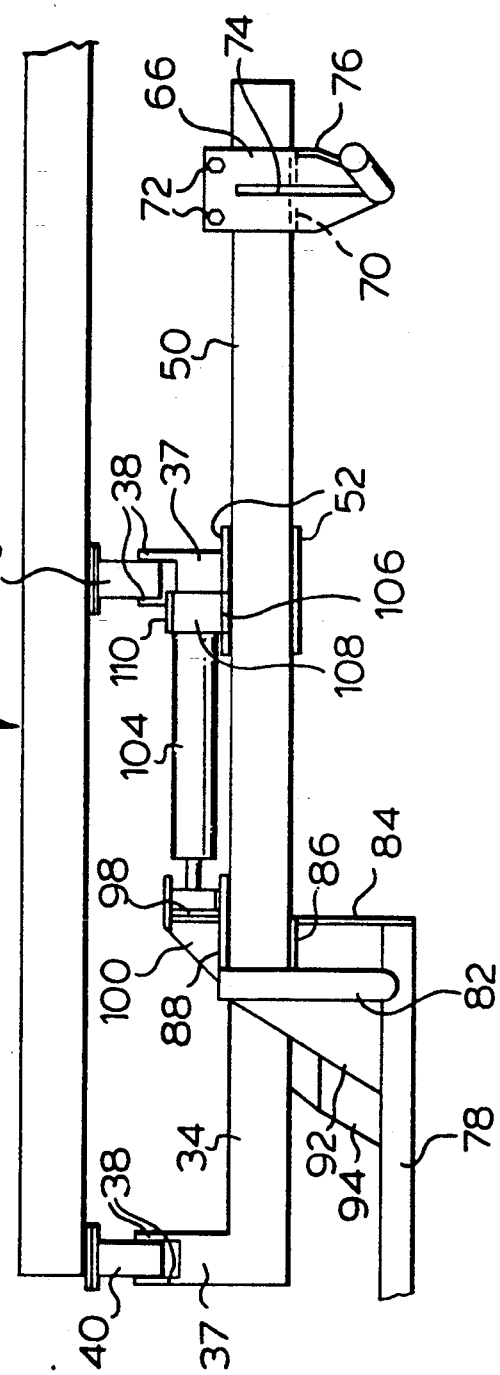
FIG. 2.
FIG. 3.

QUARTER TURN BALE LIFT ARM FOR ROUND BALE MOVERS

FIELD OF THE INVENTION

The present invention relates to bale carriers and more particularly to carriers for large round bales.

BACKGROUND OF THE INVENTION

One form of carrier for transporting large, round bales of hay or other crops includes a bale support for carrying a row of bales arranged end-to-end in the direction of travel of the carrier. The carrier may be equipped with a pick-up for picking up a bale as the carrier moves to a position beside the bale and lifting the bale onto the bale support. The bale is then transported along the support so the receiving position on the support is available for receiving the next bale from the pick-up.

An apparatus for this purpose must travel in a direction across the path of travel of the baler that made the bale, because the longitudinal, end-to-end dimension of the bale is generally across the path of the baler, while it is in line with the bale pick-up path. This creates problems in many instances. For example, in a ditch the bale carrier cannot travel up across the ditch to pick up and load the bales. On a slope it is often undesirable to travel across the slope for reasons of carrier stability.

In some bale carriers of the type in question, there are two side-by-side bale supports for carrying side-by-side rows of bales. This type of carrier conventionally requires two pick-ups, one on each side of the carrier for supplying bales to the respective supports.

SUMMARY OF THE INVENTION

A round bale carrier is disclosed herein which picks up hay bales while moving in a direction perpendicular to a longitudinal end-to-end direction of a bale to be loaded onto the carrier, and a bale pick-up supported by the bale carrier. The bale pick-up comprises an open sided bale cradle including a cradle base located parallel along one side of the carrier when in a pick-up position and swingable in a horizontal plane through 90 degrees to a bale loading position relative to the carrier. First and second bale support arms are secured to the cradle base with the first bale support arm extending out at generally right angles to the cradle base and the second bale support arm being moveable at the cradle base and the second bale support arm being moveable at the cradle base between a bale receiving position generally perpendicular to the first bale support arm and a bale pick-up position generally parallel to the first bale support arm. The bale cradle also is liftable from the bale loading position to a bale delivery position projecting upwardly from the one side of the carrier. A control system is provided for the bale pick-up and tis control system includes a first operating member which moves the second bale support arm, a second operating member which swings the cradle base and a third operating member which raises and lowers the cradle. The control system operates such that after the first operating member moves the second bale support arm to the bale pick-up position, the third operating member raises the cradle sufficiently to elevate a bale int he cradle away form ground level before the second operating member swings the cradle to the bale loading position. The third operating member then continues to raise the cradle to the bale delivery position.

BRIEF DESCRIPTION OF THE DRAWINGS

In the accompanying drawings which illustrate an exemplary embodiment of the present invention:

FIG. 2 is a side elevation of the bale pick-up in an open condition;

FIG. 3 is a side elevation of the bale pick-up in an open condition;

DETAILED DESCRIPTION

Figure 1:
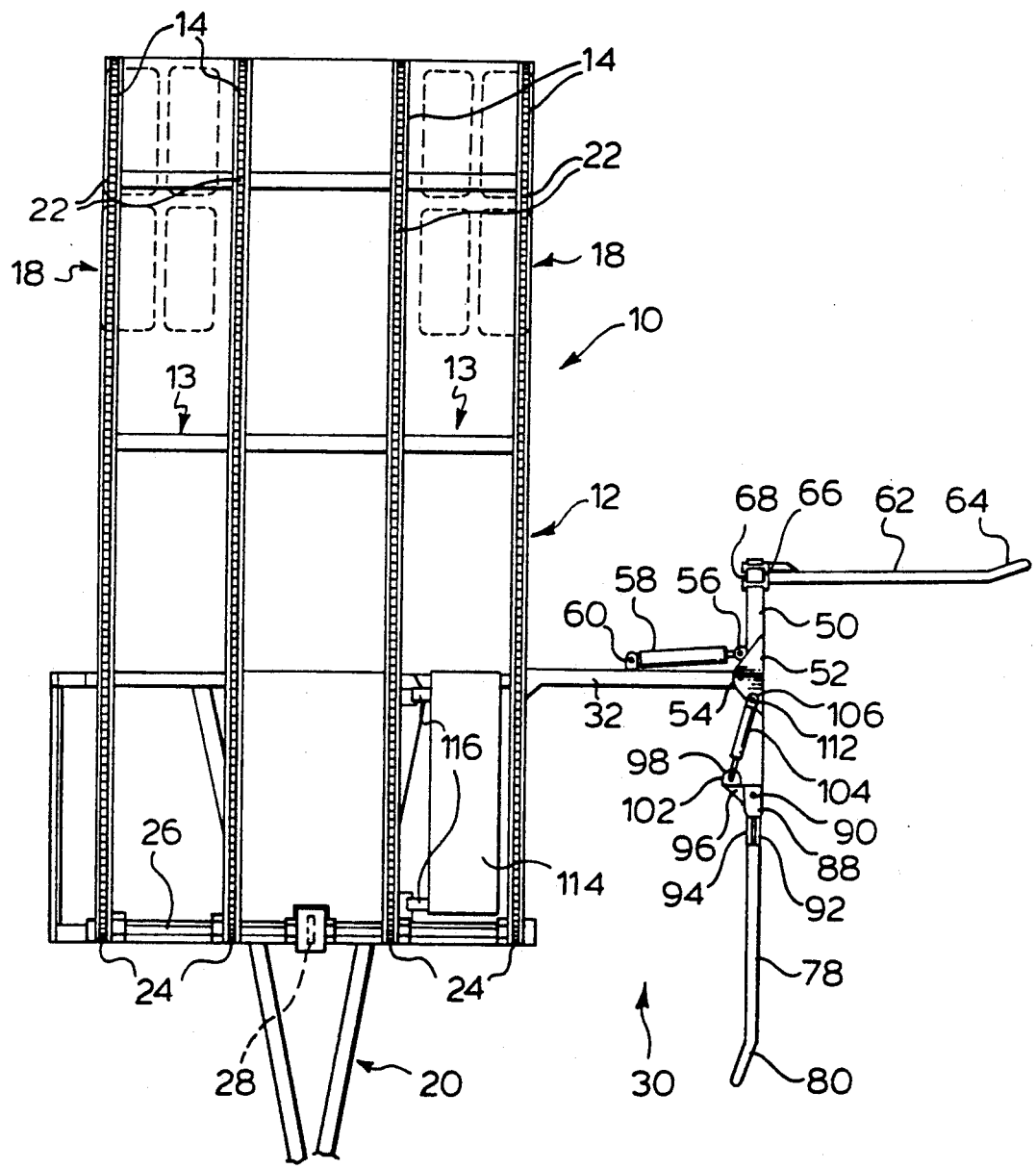
FIG. 1 is a plan view of a carrier according to the present invention.

Referring to the accompanying drawings, and especially to FIGS. 1, 2 and 3, there is illustrated a bale carrier 10 in the form of a trailer having a frame 12 with two bale supports 13 extending the length of the carrier. Each support includes two parallel bale support rails 14 mounted on the frame. The bale carrier is mounted on transport wheels 18 and has a tongue 20 at the front end so that it can towed by a leading vehicle, for example a tractor.

Each of the bale support rails supports a bale transport chain 22 engaged around sprockets 24 at the front end of the carrier and idler sprockets (not shown) at the rear end of the carrier. The sprockets 24 are mounted on a cross shaft 26 driven by drive sprocket 28 through a chain drive from a hydraulic motor (not shown).

Carriers of this general form are known and may be constructed with a tilting bed to assist in unloading bales from the bale supports.

Projecting to one side of the carrier is a bale pick-up 30 for picking up large round bales and depositing them on the carrier. The bale pick-up has a lift arm 32 that projects to the side of the carrier. It is mounted on the carrier by a beam 34 that extends longitudinally of the carrier, beneath one side of the carrier frame. At each end, the beam has a vertical end section 37 terminating in two vertical pivot plates 38 connected pivotally to supports 40 by pins 42.

On the inner side of the beam, near its rear end, are two lugs 44 that are connected by a pin 46 to the rod of a hydraulic lift cylinder 48. The opposite end of the cylinder is connected to the frame of the carrier. Extension of the cylinder will pivot the beam 34 and the lift arm 32 about the pins 42 to bring it from the horizontal position illustrated in FIGS. 1, 2 and 3 to an upright orientation as will be described more fully in connection with FIGS. 7, 8 and 9.

Figure 6:
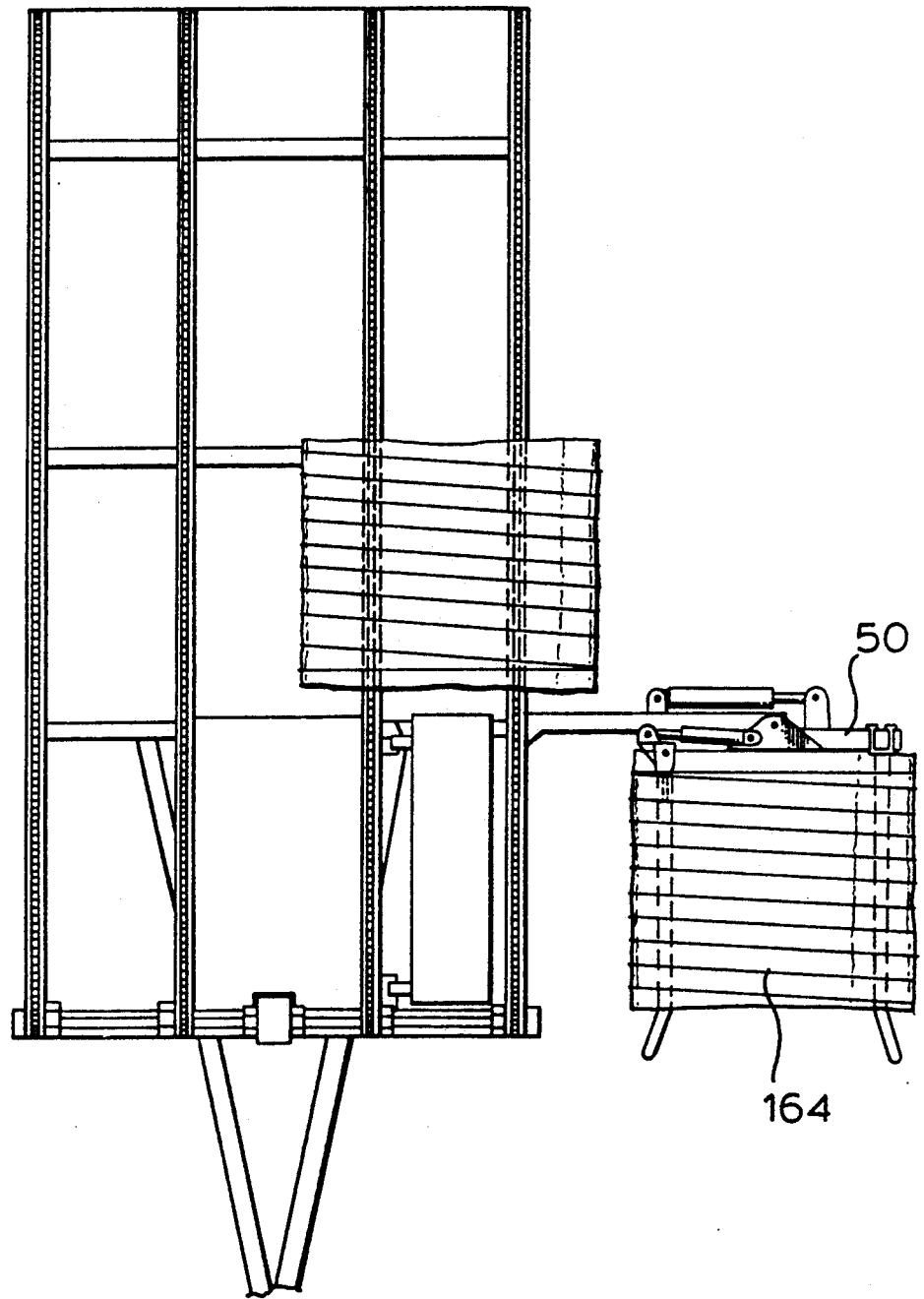

Extending across the end of the lift arm 32 is a swing arm 50. The mid-point of the swing arm carries two mounting plates 52 that extend respectively above and below the ends of the lift arm 32. The mounting plates are connected to the end of the lift arm by a pivot pin 54, allowing the swing arm to swing from the transverse orientation illustrated in FIGS. 1, 2 and 3 to a position extending along the front of the lift arm as illustrated most particularly in FIG. 6.

The swing arm carries a pair of lugs 56 on the back side, spaced from the pivot pin 54. The lugs are pivotally connected to the rod of a swing arm cylinder 58. The cylinder end of the cylinder 58 is connected to the lift arm 32 by a pair of lugs 60.

The swing arm 50 carries a bale support arm 62 that is generally round and has an outwardly and upwardly sloping outer end section 64. The arm 62 is fixed to two mounting plates 66 and 68 that project upwardly from the arm on opposite sides of the swing arm 50. A base plate 70 joins the two mounting plates 66 and 68 and engages the bottom of the swing arm. Two bolts 72 couple the mounting plates above the swing arm, thus mounting the support arm 62 adjustably on the swing arm 50. A gusset 74 joins the front mounting plate 68 to the top surface of the bale support arm 62 and a side gusset 76 extends forwardly from the rear side of the mounting plate 68 and projects along the side of the support arm 62, to which it is welded.

A movable bale support arm 78 is connected to the forward end of the swing arm 50. The movable bale support arm is round in cross section and has an outer end section 80 that slopes outwardly and upwardly from the main body of the arm. Adjacent the end of the swing arm 50, the support arm 78 is connected to an upright tube 82 and an end plate 84. A lower pivot plate 86 joins the tube to the end upper edge of the plate and lies on the underside of the swing arm 50. An upper pivot plate 88 extends over the top of the tube 82 and the swing arm 50. A pivot pin 90 extends through the pivot plate 86 and 88 and the swing arm 50 to mount the pivot support arm 78 on the end of the swing arm. A gusset 92 joins the top of the support arm to the tube 82 while the side of the support arm is connected to the side edge of the end plate 84 by a side gusset 94.

The upper pivot plate 88 extends beyond the pivot pin 90 to provide an ear 96 extending toward one side of the support arm 78 as shown most particularly in FIG. 1. A top plate 98 is positioned above this extension of the pivot plate and is connected to it by an upright plate 100. The top plate and the upper pivot plate carry a pivot pin 102 connected to the rod end of a support arm cylinder 104. The cylinder end of cylinder 104 is mounted on the swing arm 50 by a cylinder support 106 having a pair of upright side plates 108 and a top plate 110 and carrying an upright pivot pin 112.

Figure 7:
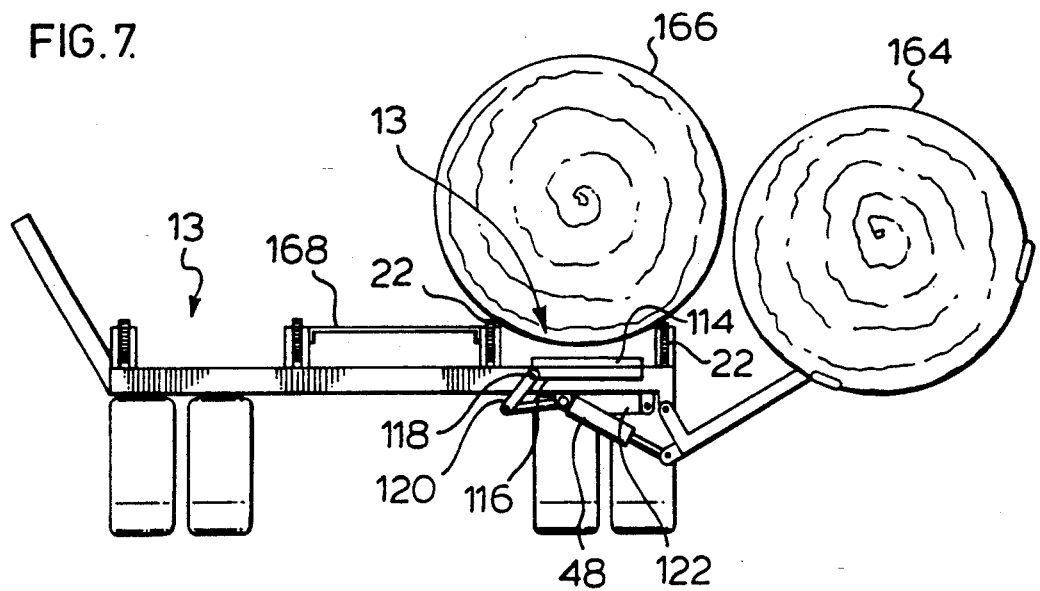
FIGS. 7, 8 and 9 are front elevational views showing the lifting, loading and transfer of a bale from one support to another.
Figure 8:
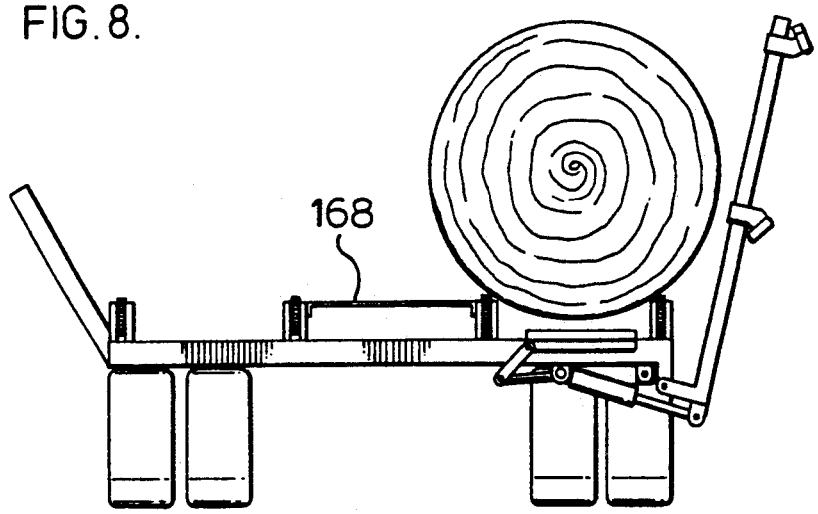
Figure 9:
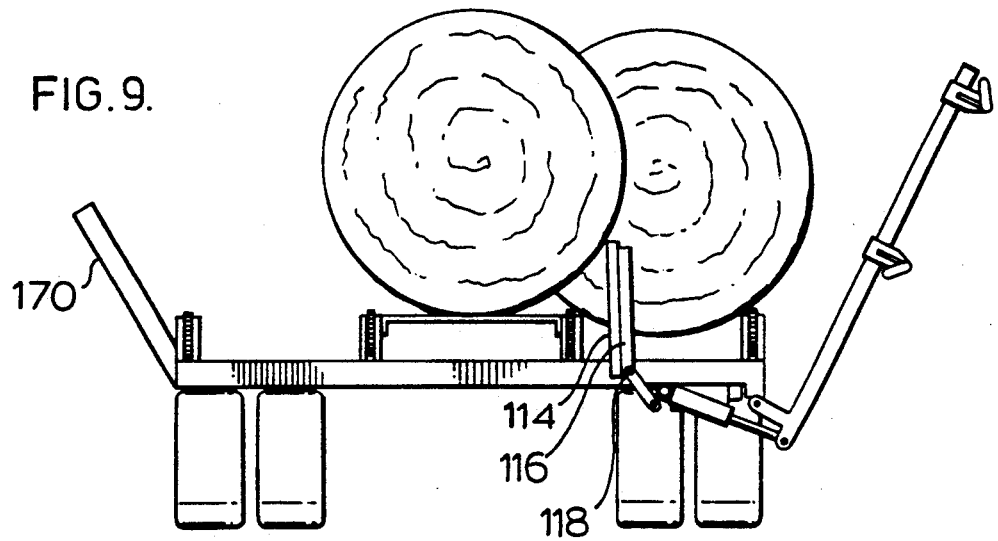

The pick-up as thus described picks up individual bales and places them at a receiving position on the adjacent bale support at the front of the carrier. The bale transport chains will transport the bale along the support towards the rear of the carrier. To transfer bales from the support where they are deposited to a receiving position on the other support, the carrier is equipped with a kicker plate 114 mounted on two support arms 116. The arms project towards the lateral centre of the carrier and each is connected to the carrier frame by a pivot 118 (FIGS. 7, 8 and 9). One of the arms carries a crank arm 120 at its innermost end, projecting inwardly and downwardly from the pivot 118. This is connected to the rod end of a kicker cylinder 122 that is horizontally oriented and pivotally connected at its opposite end to the frame of the carrier.

Figure 10:
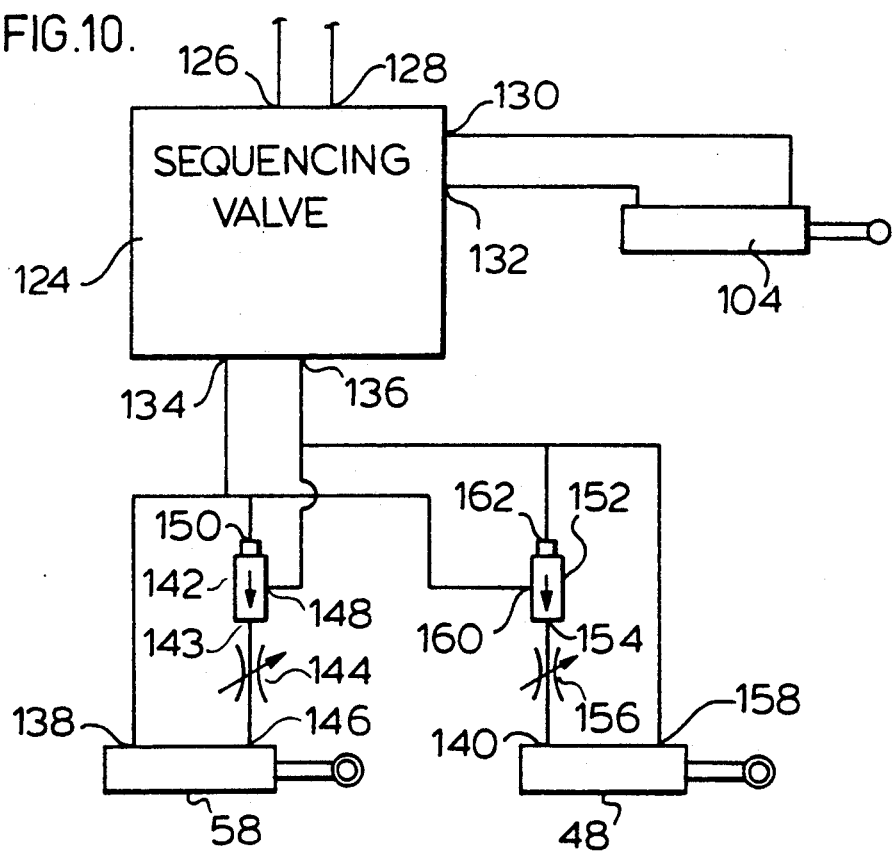
FIG. 10 is a schematic of the hydraulic circuit for the pick-up.

The hydraulic circuit for operating the pick-up is illustrated in FIG. 10. It includes an automatic sequencing valve 124 with supply ports 126 and 128. The sequencing valve has outlet ports 130 and 132 that are connected to the opposite ends of the bale support arm cylinder 104 for swinging the bale support arm between the initial position illustrated in FIG. 1 and the bale engaging position illustrated in FIG. 5. The sequencing valve also has lift and swing arm cylinder ports 134 and 136. The port 134 is connected to the cylinder end inlet 138 of the swing arm cylinder 58. The port 136 is connected to the rod end inlet 140 of the lift arm 148.

A pilot check valve 142 has its outlet 143 connected through a variable restrictor 144 to the rod end inlet of the swing arm cylinder 58. The inlet 148 of the pilot check valve is connected to the port 136 of the sequencing valve. The pilot port 150 of the check valve 142 is connected to the port 134 of the sequencing valve. The pilot check valve is normally closed to prevent flow out of the rod end of cylinder 58 through the restrictor 144. If the pilot port is pressurized, the valve opens, permitting flow out of the port 146 of the cylinder 58. Flow in the opposite direction, into port 146, is passed by the check valve whether the pilot port is or is not pressurized.

A similar check valve 152 has its outlet 154 connected through a variable restrictor 156 to the cylinder end inlet 140 of the lift arm cylinder 48. The inlet 160 of the check valve is connected to the port 134 of the sequencing valve, while the pilot port 162 is connected to the port 136 of the sequencing valve.

In operation, the sequencing valve will first supply hydraulic fluid through the ports 130 and 132. When the cylinder 104 or the related mechanism bottoms out, pressure will build up in the sequencing valve and it will trip, to supply fluid through the ports 134 and 136.

When the port 134 is pressurized, hydraulic fluid under pressure is supplied to the swing arm cylinder 58 to extend the cylinder and swing the arm. Hydraulic fluid under pressure is also supplied through the check valve 152 and the restrictor 156 to the lift cylinder 48. Application of pilot pressure to the check valve 142 allows a return flow from the rod end of the swing arm cylinder 58. By appropriate adjustment of the flow restrictors 144 and 156, the sequential operation of the cylinders 48 and 58 can be controlled.

The operation of the bale pick-up system is illustrated most particularly in FIGS. 4 through 9.

Figure 4:
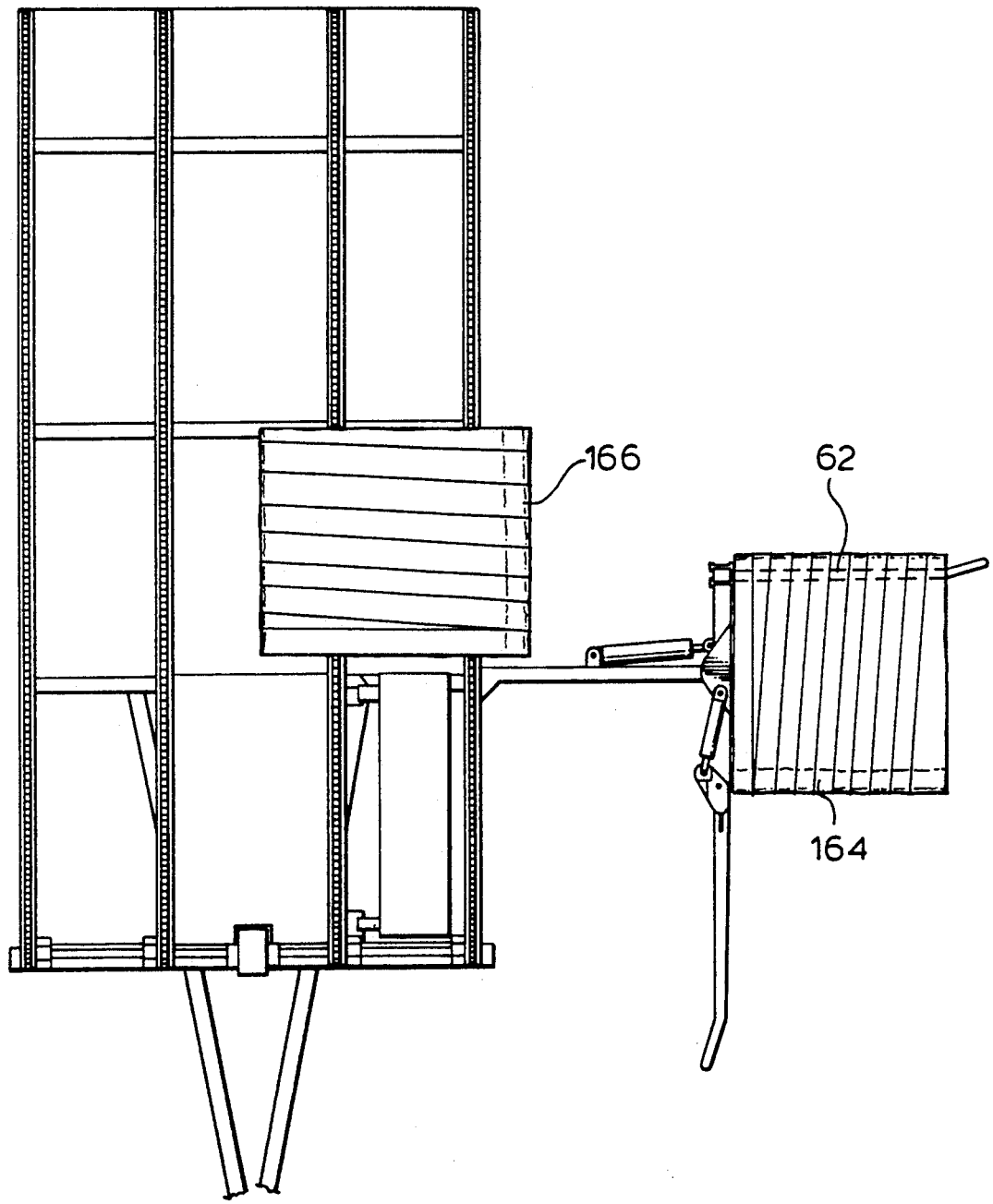
FIGS. 4, 5 and 6 are plan views showing sequential steps in engaging and turning a bale before it is loaded.

In FIG. 4, the carrier is shown as having approached a bale 164. The carrier is positioned across the end of the bale, with the direction of travel of the carrier parallel to the direction of travel of the baler. A previously bale 166 is shown on the carrier. The bale support arm 62 has engaged under the side of the bale at this time.

Figure 5:
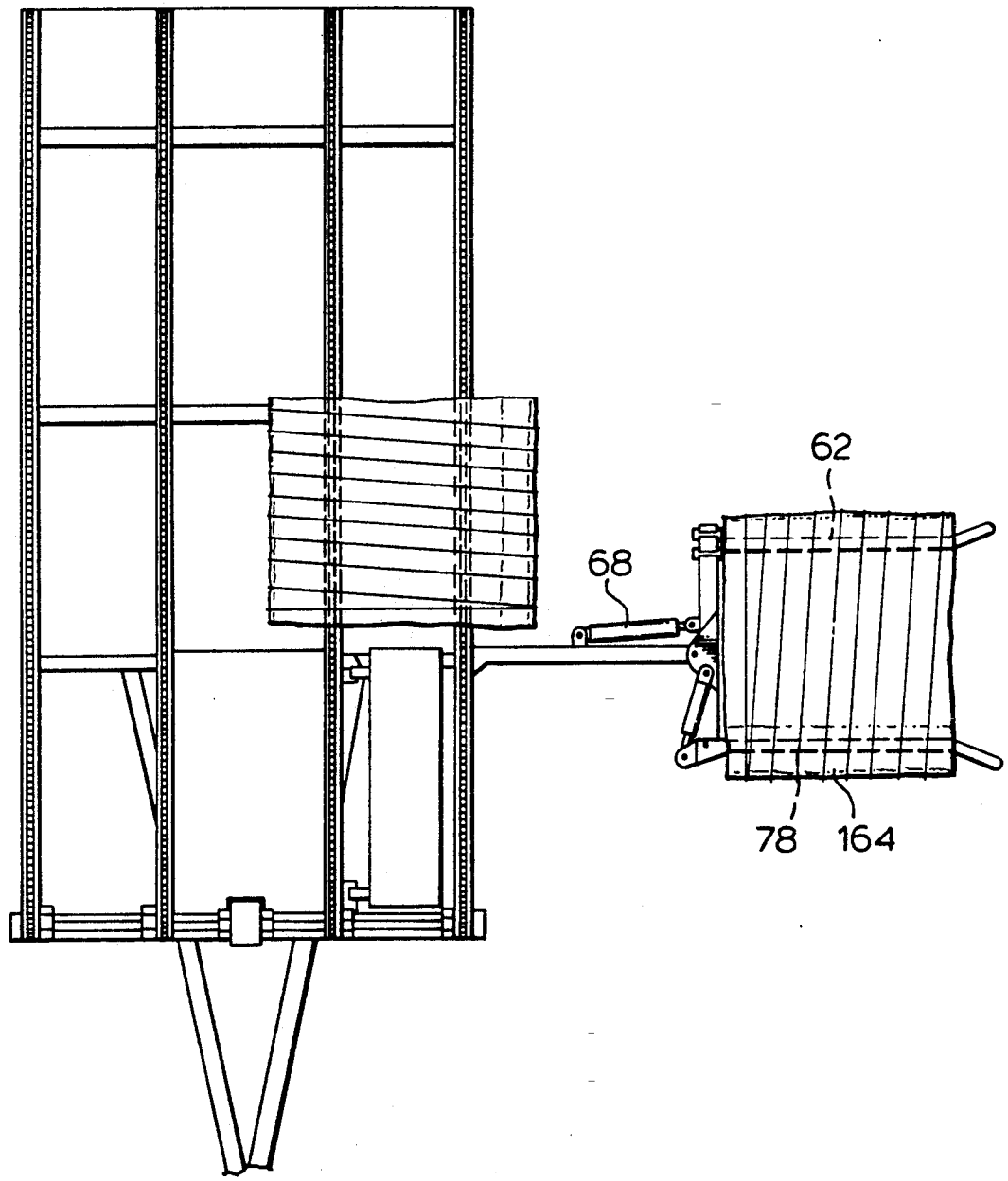

As illustrated in FIG. 5, on actuation of the hydraulic system for the bale lifter, the movable bale support arm 78 is pivoted to engage the front side of the bale. At this point, the sequencing valve trips and hydraulic fluid is supplied to the lift cylinder 48 and the swing arm cylinder 58. With the flow restrictors 144 and 156 (FIG. 10) appropriately adjusted, pressure will be applied to the lift cylinder sufficient to lift some of the weight of the bale off the ground, while the bulk of the fluid flow is to the swing arm cylinder 58, which turns the bale to the position illustrated in FIG. 6. The pressure applied to the lift cylinder ensures the bale can be turned by the swing cylinder without excessive drag from the engagement of the bale with the ground.

Once the swing arm is bottomed out, hydraulic fluid flow is supplied to the lift arm cylinder 48 and the lift arm is raised as illustrated most particularly in FIG. 7 to lift the bale to the point where it will roll off of the cradle provided by the two support arms onto the adjacent bale support 13 at a receiving position near the front of the carrier. If the bale is to remain on the bale support adjacent the pick-up, the bale transport chains 22 are operated to drive the bale to the rear, out of the receiving position so that another bale can be put in place. If however, the bale is to be shifted to the receiving position of the other bale support, the cylinder 122 is activated to pivot the kicker plate 114 upwardly and displace the bale across the carrier to the other support, where it can be transported rearwardly by the bale transport chains. To ensure that the bale will travel across the centre of the carrier, a flat pan 168 is mounted on the carrier between the receiving positions of the two supports. On the side of the carrier opposite the pick-up is a roll bar 170 that prevents the bale from rolling off the carrier when it reaches the second support receiving position.

The use of the pick-up mechanism allows the carrier to travel across the terrain on which such bales are deposited in a path parallel to that followed by the baler used to make the bales. This is of particular importance where the ground is not level or in environments such as ditches where a carrier cannot be driven from side to side in the space available.

While one embodiment of the invention has been described in the foregoing, it is to be understood that other embodiments are possible within the scope of the invention. The invention is to be considered limited solely by the scope of the appended claims.

We claim:

1. A round bale carrier which picks up round hay bales while moving in a direction perpendicular to a longitudinal end-to-end direction of a bale to be loaded onto said carrier, and a bale pick-up supported by said bale carrier, said bale pick-up comprising an open sided bale cradle including a cradle base located parallel along one side of said carrier when in a position to receive and pick up a hay bale and swingable in a horizontal plane through 90 degrees to a bale loading position relative to said carrier, first and second bale support arms secured to said cradle base, said first bale support arm extending out at generally right angles to said cradle base, said second bale support arm being moveable at said cradle base between a bale receiving position generally perpendicular to said first bale support arm and a bale pick-up position generally parallel to said first bale support arm, said bale cradle also being liftable form said bale loading position to a bale delivery position projecting upwardly form the one side of said carrier, and a control system for said bale pick-up, said control system including a first operating member which moves said second bale support arm, a second operating member which swings said cradle base and a third operating member which raises and lowers said cradle, said control system operating such that after said first operating member moves said second bale support arm to the bale pick-up position, said third operating member raises said cradle sufficiently to elevate the bale in the cradle away form ground level before said second operating member swings said cradle to the bale loading position, said third operating member then continuing to raise said cradle to the bale delivery position.

2. A round bale carrier and bale pick up as claimed in claim 1, wherein said first and second operating members are both mounted to said cradle base.

3. A bale carrier and bale pick up as claimed in claim 1, wherein said control system comprises a hydraulic system and wherein said first and second operating members comprises first and second cylinders respectively and said hydraulic system includes a sequencing valve arrangement which controls movement of said second bale support arm by said first cylinder and said second cylinder to swing said cradle base.

4. A round bale carrier and pick up as claimed in claim 3 wherein said third operating member comprises a third cylinder for lifting said cradle base and wherein movement of said cradle base by said second cylinder operates said third cylinder to lift said cradle base.

5. A round bale carrier which picks up bales while moving in a direction perpendicular to a longitudinal end to end direction to a bale to be loaded onto said carrier, ad a bale pick up on said carrier, said bale pick up comprising a bale cradle including a cradle base located parallel along one side of the carrier when in a bale pick up position and swingable in a horizontal plane through 90° from the bale pick up position to a bale loading position, first and second bale support arms secured to said cradle base, said first bale support arm extending out at generally right angles to said cradle base, said second bale support arm being movable at said cradle base between a bale receiving position generally perpendicular to said first bale support arm and the bale pick up position generally parallel to said first bale support arm, a lift arm for lifting said bale cradle from the bale pick up position to a bale loading position in which the bale is loaded on the carrirer, and operating means for said bale pick up, said operating means comprising second bale support arm displacement means, cradle base displacement means and lift arm displacement means, said operating means including control means for controlling said second bale support arm displacement means to move said second bale support arm from the bale receiving position to the bale pick up position while disabling the cradle base displacement means and the lift arm displacement means, and operating said lift arm displacement means to exert a lifting force on the bale cradle sufficient to at least partially lift the bale and simultaneously operating the cradle base displacement means to move the cradle base from the bale pick up position to the bale loading position.

6. A bale carrier as claimed in claim 5, wherein said control means comprises mean responsive to the cradle base reaching the bale loading position for operating the lift arm displacement means and moving the lift arm from the bale loading position to the bale delivery position.

7. A bale carrier as claimed in claim 6, wherein said control means comprises means for simultaneously operating said second arm displacement means to more said second bale support arm from the bale pick up position to the bale receiving position to move the cradle base displacement means for the bale loading position to the bale pick up position and the lift arm displacement means form the bale delivery position to the bale loading position.

* * * * *